(12) United States Patent
Sahin

(10) Patent No.: US 12,344,367 B2
(45) Date of Patent: Jul. 1, 2025

(54) ADJUSTABLE LANDING GEAR

(71) Applicant: Tusas- Turk Havacilik Ve Uzay Sanayii Anonim Sirketi, Ankara (TR)

(72) Inventor: Burhan Sahin, Ankara (TR)

(73) Assignee: Tusas- Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 18/724,726

(22) PCT Filed: Nov. 9, 2022

(86) PCT No.: PCT/TR2022/051262
§ 371 (c)(1),
(2) Date: Jun. 27, 2024

(87) PCT Pub. No.: WO2023/129006
PCT Pub. Date: Jul. 6, 2023

(65) Prior Publication Data
US 2025/0066016 A1    Feb. 27, 2025

(30) Foreign Application Priority Data
Dec. 28, 2021   (TR) .............................. 2021/021414

(51) Int. Cl.
B64C 25/00     (2006.01)
B64C 25/26     (2006.01)
B64C 25/32     (2006.01)

(52) U.S. Cl.
CPC .............. B64C 25/26 (2013.01); B64C 25/32 (2013.01); B64C 2025/325 (2013.01)

(58) Field of Classification Search
CPC ... B64C 25/26; B64C 2025/008; B64C 25/10; B64U 60/40
See application file for complete search history.

(56) References Cited

U.S. PATENT DOCUMENTS 2,092,662 A * 9/1937 Weymouth .............. B64C 25/10
254/2 R
2,454,611 A * 11/1948 Paraskevas ............. B64C 25/02
244/102 R
2,476,154 A    7/1949 Lohs
(Continued)

FOREIGN PATENT DOCUMENTS

GB    1164159    9/1969
WO   WO-2020245897 A1 * 12/2020  ............ F25B 41/385

OTHER PUBLICATIONS

International Search Report and the Written Opinion Dated Jun. 7, 2023 From the International Searching Authority Re. Application No. PCT/TR2022/051262. (5 Pages).

*Primary Examiner* — Brian M O'Hara

(57)    ABSTRACT

The present invention relates to a body (2) provided on an air vehicle; at least a first mount (3) which is located on the body (2) so as to move on the body (2) in a direction it lies, and which carries the air vehicle by contacting the ground when the air vehicle lands; an open position (I) in which the first mount (3) extends out of the body (2) and carries the air vehicle; a closed position (II), wherein the first mount (3) is moved in the body (2) to be brought from the open position (I) to the closed position (II); at least one motor (4) that moves the first mount (3) between the open position (I) and the closed position (II).

12 Claims, 4 Drawing Sheets

(56) References Cited

U.S. PATENT DOCUMENTS

| | | | | |
|---|---|---|---|---|
| 4,630,788 | A | * | 12/1986 | Veaux ..................... B64C 25/60 244/100 R |
| 6,623,035 | B1 | * | 9/2003 | Schneider ................. B60S 9/04 254/419 |
| 8,136,754 | B2 | * | 3/2012 | De Ruffray ............. B64C 25/50 244/50 |
| 8,561,945 | B2 | | 10/2013 | Engleder et al. |
| 11,433,991 | B2 | * | 9/2022 | Whitlock ................ B64C 19/00 |
| 2009/0008917 | A1 | * | 1/2009 | Daniel ..................... B60S 9/06 254/419 |
| 2020/0207464 | A1 | | 7/2020 | Whitlock |
| 2024/0367622 | A1 | * | 11/2024 | Roth ........................ B60S 9/06 |

* cited by examiner

ADJUSTABLE LANDING GEAR

RELATED APPLICATIONS

This application is a National Phase of PCT Patent Application No. PCT/TR2022/051262 having International filing date of Nov. 9, 2022, which claims the benefit of priority of Turkey Patent Application No. 2021/021414 filed on Dec. 28, 2021. The contents of the above applications are all incorporated by reference as if fully set forth herein in their entirety.

FIELD AND BACKGROUND OF THE INVENTION

The present invention relates to an adjustable landing gear provided in an air vehicle in a repositionable manner.

Landing gears of air vehicles such as helicopters cause the air vehicle to be exposed to higher drag during flight, and thus to fuel and speed losses. This especially occurs in skid or spider mount type landing gear without wheels. Another challenge is the difficulties experienced in landing the air vehicles, which has such a landing gear, on an uneven ground.

The United States patent document U.S. Pat. No. 8,561,945, which is included in the known-state of the art, discloses a helicopter landing gear with a skid type landing gear. By means of the motors on the helicopter, the landing gear is pulled into the helicopter and the drag force acting on the air vehicle is reduced.

Thanks to an adjustable landing gear according to the present invention, landing gear of the air vehicle is enabled to extend out of the body and received into the body in a controlled manner. In addition, a drag force acting on the air vehicle during flight is reduced.

Another object of the invention is to provide a landing gear that enables the air vehicle to land safely on a rough or sloping ground.

Another object of the invention is to provide a more rigid landing gear in retractable landing gears.

SUMMARY OF THE INVENTION

The adjustable landing gear realized to achieve the object of the invention, which is defined in the first claim and other claims dependent thereon, comprises a body located on the air vehicle; at least a first mount which is located on the body in a movable manner and forms the landing gear of the air vehicle; an open position (I) in which the first mount extends out of the body and carries the air vehicle when it lands; a closed position (II) in which the first mount is triggered to be retracted from the open position (I) into the body during the flight of the air vehicle; at least one motor that moves the first mount from the open position (I) to the closed position (II) or from the closed position (II) to the open position (I).

The adjustable landing gear according to the invention comprises at least a second mount mounted on the body in a fixed manner, and on which the first mount moves; at least one rack gear located on the second mount, which enables the first mount to move on the second mount while moving from the open position (I) to the closed position (II); at least one pinion gear located on the first mount and acting on the rack gear, thus enabling the first mount to move on the second mount; the motor located on each first mount and triggering the pinion gear.

In an embodiment of the invention, the adjustable landing gear comprises at least a first protrusion located on the first mount to extend outward from the first mount; at least one stopper movably located on the body and preferably extending parallel to the second mount on the body; at least a second protrusion which is located on the stopper to extend outward from the stopper, contacts the first protrusion by means of the stopper moved towards the first mount, thereby stopping movement of the first mount relative to the second mount.

In an embodiment of the invention, the adjustable landing gear comprises a locked position (III) in which the first protrusion and the second protrusion are in contact with each other so that the first mount is prevented from moving relative to the second mount; a free position (IV) in which the stopper is triggered to move, so that the first mount can move freely on the second mount, preventing contact of the second protrusion with the first protrusion.

In an embodiment of the invention, the adjustable landing gear comprises a plurality of first protrusions extending over the first mount to face the second protrusion; a plurality of second protrusions extending inclined over the stopper to remain opposite the first protrusion and interlocking with the first protrusion in the locked position (III) due to its inclined structure. Since the first protrusion and the second protrusion extend in an inclined manner, no additional force is applied to keep the stopper in the locked position after the stopper is moved into the locked position.

In an embodiment of the invention, the adjustable landing gear comprises at least one trigger that moves the stopper from the locked position (III) to the free position (IV) or moves the stopper from the free position (IV) to the locked position (III).

In an embodiment of the invention, the adjustable landing gear comprises the trigger which consists of a plurality of wires extending longitudinally along the second mount and the stopper, wherein when a current is passed through the wires in a same direction relative to each other, the wires apply a magnetic force to each other so as to move the stopper away from the second mount, so that the stopper is moved into the free position (IV).

In an embodiment of the invention, the adjustable landing gear comprises the trigger which consists of a plurality of wires extending longitudinally along the second mount and the stopper, wherein when a current is passed through the wires in an opposite direction relative to each other, the wires apply a magnetic force to each other so as to move the stopper towards the first mount, so that the stopper is moved into the locked position (III). The current passing through the wires in the opposite direction enables the stopper to be moved to the locked position. Thanks to the first protrusion and the second protrusion on the first mount and the stopper, the stopper is clamped with the first mount. Thanks to the clamping, it is not necessary to constantly run current through the wires to keep the stopper in the locked position.

In an embodiment of the invention, the adjustable landing gear comprises the trigger, which is a piston that triggers the stopper.

In an embodiment of the invention, the adjustable landing gear comprises at least one spring between the second mount and the stopper, which applies force to the stopper to move the stopper into the free position (IV), so that the first mount can be moved to the closed position (II) when the air vehicle takes off.

In an embodiment of the invention, the adjustable landing gear comprises a control unit which measures a current change occurring when the motor is forced, wherein when the first mount contacts the ground and a current drawn by the motor increases to move the first mount, the control unit detects that the current drawn by the motor exceeds a current value predetermined by the user, thus triggering the trigger to move the stopper to the locked position (III).

In an embodiment of the invention, the adjustable landing gear comprises a support element contacting the second protrusions, which are located parallel to each other on the second mount with a distance therebetween and which are located on the stopper when the stopper is in the locked position, thus enabling the second mount to carry the force applied by the first protrusions on the first mount, instead of the stopper.

In an embodiment of the invention, the adjustable landing gear comprises the control unit which triggers the stopper during landing of the air vehicle to move the stopper from the locked position (III) to the free position (IV), so that the first mount is triggered from the closed position (II) to the open position (I), wherein the control unit:
- triggers the motor on the first mount, enabling the pinion gear to move on the rack gear, thus moving the first mount on the second mount,
- measures the current drawn by the motor when the plurality of first mounts on the air vehicle contact the ground, transmits a command to the trigger to enable the stopper to move from the free position (IV) to the locked position (III), when the current drawn by the motor reaches the value predetermined by the user,
- enables the trigger to move the stopper from the locked position (III) to the free position (IV) when the air vehicle takes off,
- moves the first mount on the second mount by means of the motor located on the first mount, thus moving the first mount from the open position (I) to the closed position (II).

In an embodiment of the invention, the adjustable landing gear comprises an air vehicle body provided on helicopter.

BRIEF DESCRIPTION OF THE SEVERAL VIEWS OF THE DRAWINGS

The adjustable landing gear realized to achieve the object of the present invention is illustrated in the attached drawings, in which.

DESCRIPTION OF SPECIFIC EMBODIMENTS OF THE INVENTION

Figure 6:
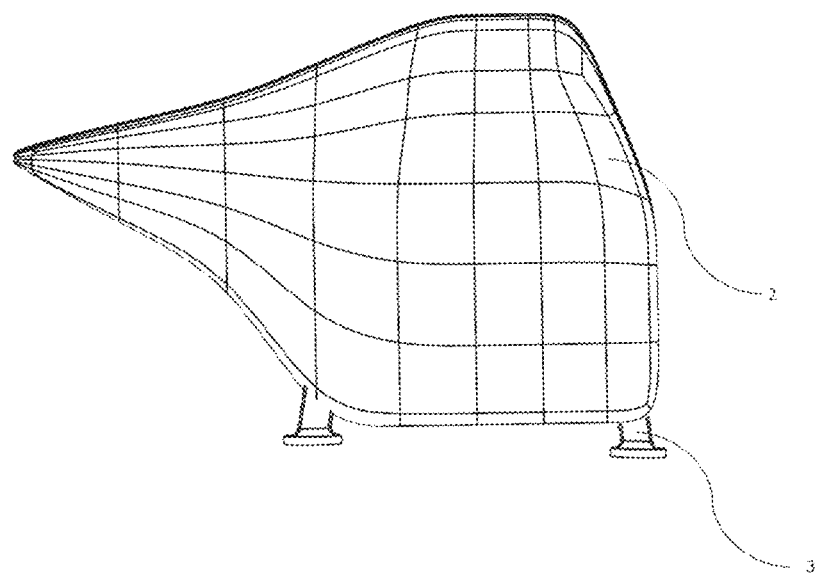
FIG. 6 is a side view of the first mount in the closed position (II).
Figure 7:
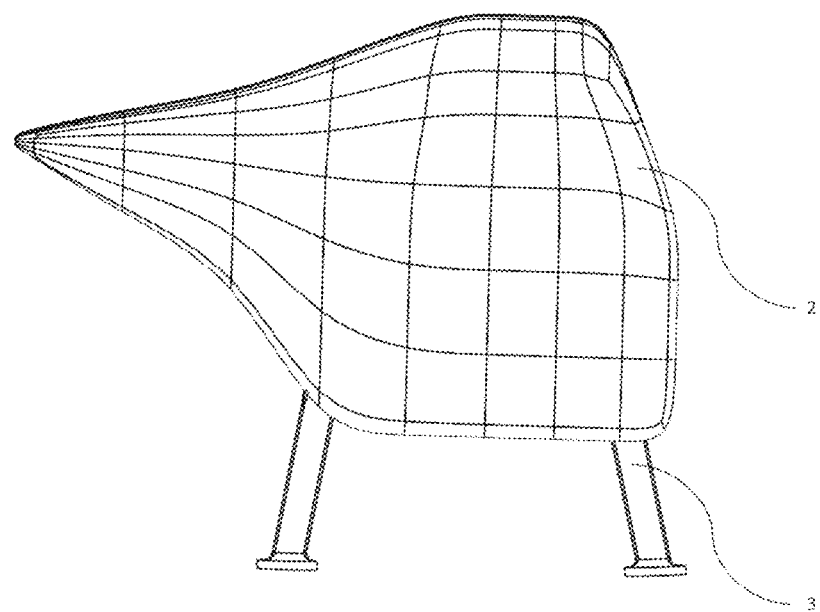
FIG. 7 is a side view of the first mount in the open position (I).

All the parts illustrated in figures are individually assigned a reference numeral and the corresponding terms of these numbers are listed below:
1. Adjustable Landing Gear
2. Body
3. First Mount
4. Motor
5. Second Mount
6. Rack Gear
7. Pinion Gear
8. First Protrusion
9. Stopper
10. Second Protrusion
11. Trigger
12. Spring
13. Control Unit
14. Support Element
(I) Open Position
(II) Closed Position
(III) Locked Position
(IV) Free Position The adjustable landing gear (1) comprises a body (2) provided on the air vehicle; at least a first mount (3) which is located on the body (2) so as to move on the body (2) in a direction it lies, and which carries the air vehicle by contacting the ground when the air vehicle lands; an open position (I) in which the first mount (3) extends out of the body (2) and carries the air vehicle; a closed position (II), wherein the first mount (3) is moved in the body (2) to be brought from the open position (I) to the closed position (II); at least one motor (4) that moves the first mount (3) between the open position (I) and the closed position (II) (FIG. 6, FIG. 7).

The adjustable landing gear (1) according to the invention comprises at least a second mount (5) fixed on the body (2); at least one rack gear (6) located on the second mount (5), which enables the first mount (3) to move from the open position (I) to the closed position (II) or from the closed position (II) to the open position (I) by moving on the second mount (5); at least one pinion gear (7) located on the first mount (3) and acting on the rack gear (6), thus enabling the first mount (3) to move on the second mount (5); the motor (4) located on each first mount (3) and enabling the pinion gear (7) to be triggered.

Thanks to the motor (4) located on the body (2), the first mount (3), which extends outward from the body (2) in the open position (I), can be retracted into the body (2) to be in the closed position (II), thus the drag force acting on the air vehicle during a flight can be reduced.

The first mount (3) moves on the second mount (5) by means of the rack gear (6) located on the second mount (5), thanks to the motor (4) and the pinion gear (7). By means of the pinion gear (7) on the first mount (3) and the rack gear (6) on the second mount (5), the first mount (3) is enabled to move from the open position (I) to the closed position (II) more precisely. In addition, in the open position (I) where the first mount (3) carries the air vehicle, a more reliable and solid landing is provided by the second mount (5).

In an embodiment of the invention, the adjustable landing gear (1) comprises at least a first protrusion (8) extending outwardly over the first mount (3); at least one stopper (9) located on the body (2) movably and extending on the body (2); at least a second protrusion (10) which is located on the stopper (9) to extend outward from the stopper (9), contacts the first protrusion (8) by means of the stopper (9) moved towards the first mount (3), thereby stopping movement of the first mount (3) relative to the second mount (5). Thanks to the stopper (9) and the second protrusion (10) on the stopper (9), while the first mount (3) is moving to the open position (I) or closed position (II), it is prevented from moving on the body (2) and is kept fixed in the open position (I) or preferably in the closed position (II). In addition, the load on the motor (4), pinion gear (7) and rack gear (6) as a result of the contact of the first mount with the ground is reduced by clamping the first protrusion and the second protrusion. Therefore, the motor (4), pinion gear (7) and rack gear (6) are prevented from being damaged during the landing and take-off of the air vehicle (FIG. 3).

Figure 1:
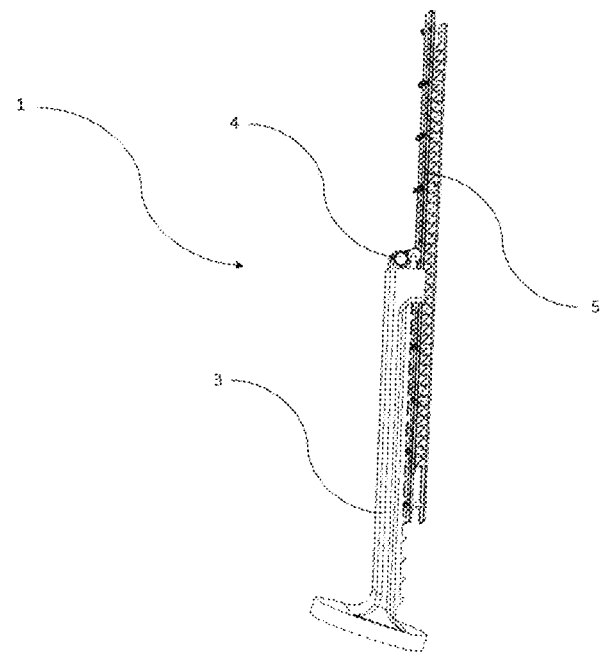
FIG. 1 is a perspective view of the landing gear.
Figure 2:
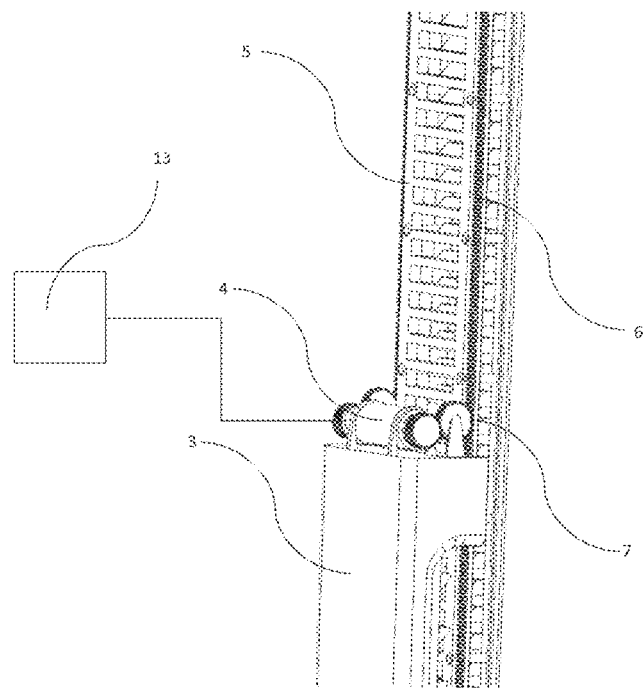
FIG. 2 is a perspective view of the first mount and the second mount.
Figure 3:
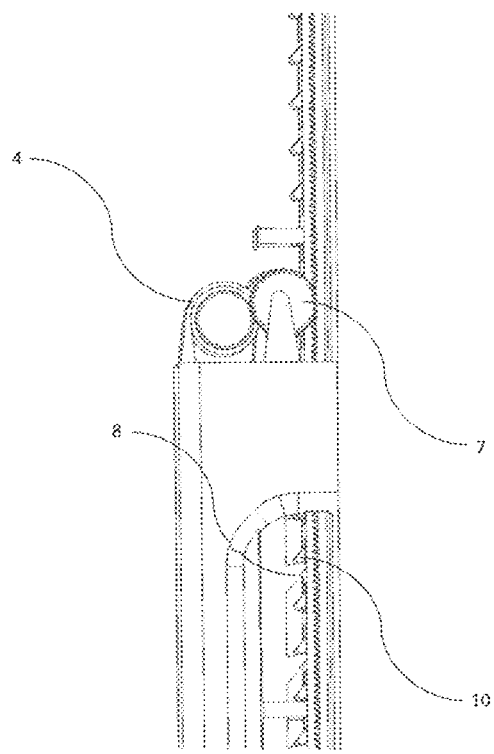
FIG. 3 is a side view of the first mount and the second mount in the locked position (III).
Figure 4:
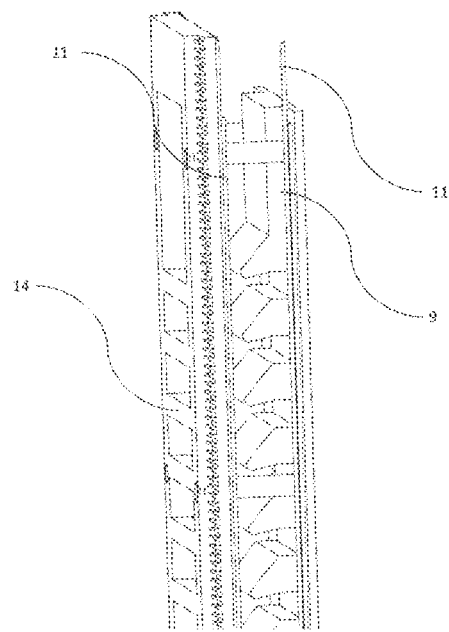
FIG. 4 is a perspective view of the second mount in the free position (IV).

In an embodiment of the invention, the adjustable landing gear (1) comprises a locked position (III) to which the stopper (9) is brought by moving on the body (2) when the first mount (3) is in the open position (I), and in which the first protrusion (8) and the second protrusion (10) contact each other so that the first mount (3) is prevented from moving relative to the second mount (5); a free position (IV) to which the stopper (9) is brought by moving on the body (2), and in which the first protrusion (8) and the second protrusion (10) are not in contact, so that the first mount (3) moves on the second mount (5) (FIG. 3, FIG. 4).

In an embodiment of the invention, the adjustable landing gear (1) comprises a plurality of first protrusions (8) extending over the first mount (3) in an inclined manner; a plurality of second protrusions (10) located on the stopper (9) so as to be opposite the first protrusion (8) in the locked position (III), and extending outwardly from the stopper (9) in an inclined manner to engage with the first protrusion (8). Since the first protrusion (8) and the second protrusion (10) extend in an inclined manner, when the air vehicle lands, weight of the air vehicle is transferred by the first mount (3) to the stopper (9), thereby preventing the stopper (9) from moving from the locked position (III) to the free position (IV).

In an embodiment of the invention, the adjustable landing gear (1) comprises at least one trigger (11) that moves the stopper (9) away from the second mount (5) to bring it to the free position (IV) or moves the stopper (9) towards the second mount (5) to bring it to the locked position (III). By means of the trigger (11), when the plurality of first mounts (3) are in different positions from each other, the stopper (9) is enabled to be controlled while moving to the locked position (III) or free position (IV).

In an embodiment of the invention, the adjustable landing gear (1) comprises the trigger (11) which consists of a plurality of wires extending along the second mount (5) and the stopper (9) so as to be opposite each other on the second mount (5) and the stopper (9), wherein when a current is passed through the wires in a same direction relative to each other, the wires enable the stopper (9) to be pulled towards the second mount (5) or when a current is passed through the wires in an opposite direction relative to each other, the wires enable the stopper (9) to be pushed. Therefore, when the air vehicle comes to the open position (I) or closed position (II), high current is passed through the wires so that the stopper (9) is moved to the locked position (III) or the free position (IV).

In an embodiment of the invention, the adjustable landing gear (1) comprises the trigger (11) which is a piston.

Figure 5:
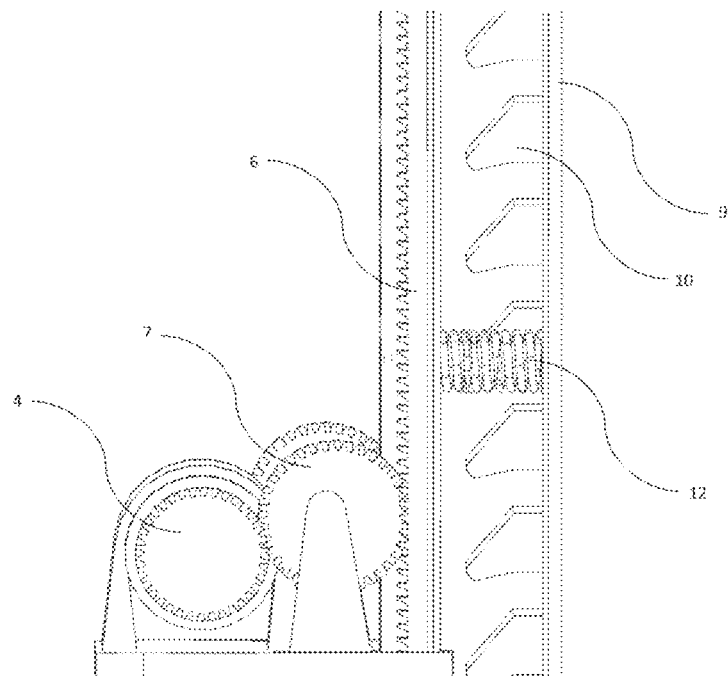
FIG. 5 is a side view of the rack gear, pinion gear and spring.

In an embodiment of the invention, the adjustable landing gear (1) comprises at least one spring (12) between the second mount (5) and the stopper (9), which applies force to the stopper (9) to move the stopper (9) from the locked position (III) to the free position (IV) during the flight. When the air vehicle takes off, the force applied by the first mount (3) on the stopper (9) due to the weight of the air vehicle is removed. When the force acting on the stopper (9) is removed, the spring (12) located between the stopper (9) and the second mount (5) automatically moves the stopper (9) away from the second mount (5) so as to bring the stopper (9) into the free position (IV) (FIG. 5).

In an embodiment of the invention, the adjustable landing gear (1) comprises a control unit (13), wherein when the first mount (3) contacts the ground, if the current drawn by the motor (4) exceeds a current value predetermined by the user, the control unit (13) enables the stopper (9) to be triggered, thereby moving the stopper (9) to the locked position (III). By means of the control unit (13) measuring the current of the motor (4), the stopper (9) is enabled to move into the locked position (III) when each of the first mounts (3) contacts the ground. In this way, it is enabled that the first mount (3) moves to the locked position (III) for each first mount (3) in a different open position (I) mount. In addition, while the helicopter is landing on a rough or sloping ground, all the first mounts (3) of the helicopter are enabled to contact the ground, and then moved to the locked position (III).

In an embodiment of the invention, the adjustable landing gear (1) comprises a plurality of support elements (14) on the second mount (5), which contact the second protrusion (10) in the locked position (III) so as to carry the force applied by the first mount (3) carrying the air vehicle to the second protrusion (10). Thanks to the support element (14), the force due to the weight of the air vehicle applied by the first mount (3) to the stopper (9) via the first protrusion (8) is transferred to the second mount (5). Therefore, weight of the air vehicle is enabled to be carried by the second mount (5) without damaging the mechanisms that move the stopper (9) during landing.

In an embodiment of the invention, the adjustable landing gear (1) comprises the control unit (13) which triggers the first mount (3) from the closed position (II) to the open position (I) during the landing of the air vehicle, enables the first mount (3) to move with the rack gear (6) and pinion gear (7) on the second mount (5) by means of the motor (4) located on the first mount (3),
- measures the current drawn by the motor (4) when the plurality of first mounts (3) on the air vehicle contact the ground and the current drawn by the motor (4) that moves each first mount (3) in contact with the ground increases,
- moves the stopper (9) by transmitting a command to the trigger (11) when the current drawn by the motor (4) reaches the value predetermined by the user,
- enables the trigger (11) to move the stop (9) from the free position (IV) to the locked position (III),
- enables the trigger (11) to move the stopper (9) from the locked position (III) to the free position (IV) when the air vehicle takes off, enables the motor (4) located on each first mount (3) to move the first mount (3) on the second mount (5), so that the first mount (3) is moved to the closed position (II).

Thanks to the control unit (13), it is enabled automatically that the first mount (3) moves from the closed position (II) to the open position (I) during landing and the stopper (9) moves to the free position (IV) or the locked position (III) by triggering the stopper (9) during the transition between the positions.

In an embodiment of the invention, the adjustable landing gear (1) comprises a body (2) located on helicopter.

The invention claimed is:

1. An adjustable landing gear provided on an air vehicle having a fuselage, the landing gear comprising:
   at least a first mount configured to move along a longitudinal direction of the first mount, and which carries the air vehicle by contacting the ground when the air vehicle lands;
   at least a second mount fixed on the fuselage;
   the landing gear configured to have: an open position (I) in which the first mount extends out of the fuselage and carries the air vehicle; and a closed position (II), wherein the first mount is moved in the fuselage to be brought from the open position (I) to the closed position (II);

at least one motor that moves the first mount between the open position (I) and the closed position (II), at least one rack gear located on the second mount, which enables the first mount to move from the open position (I) to the closed position (II) or from the closed position (II) to the open position (I) by moving along the second mount and;

at least one pinion gear located on the first mount and acting on the rackgear, thus enabling the first mount to move on the second mount;

wherein the motor is located on the first mount and enables the pinion gear to act on the at least one rack gear.

2. An adjustable landing gear according to claim 1, further comprising at least a first protrusion extending outwardly over the first mount; at least one stopper located on the fuselage in a movable manner and extending on the fuselage; at least a second protrusion which is located on the stopper to extend outward from the stopper, contacts the first protrusion by means of the stopper moved towards the first mount, thereby stopping movement of the first mount relative to the second mount.

3. An adjustable landing gear according to claim 2, configured to have a locked position (III) to which the stopper is brought by moving on the fuselage when the first mount is in the open position (I), and in which the first protrusion and the second protrusion contact each other so that the first mount is prevented from moving relative to the second mount; a free position (IV) to which the stopper is brought by moving on the fuselage, and in which the first protrusion and the second protrusion are not in contact, so that the first mount moves on the second mount.

4. An adjustable landing gear according to claim 3, further comprising the at least a first protrusion including a plurality of first protrusions extending over the first mount in an inclined manner; the at least a second protrusion including a plurality of second protrusions located on the stopper so as to be opposite the first protrusion in the locked position (III), and extending outwardly from the stopper in an inclined manner to engage with the first protrusion.

5. An adjustable landing gear according to claim 3, further comprising at least one trigger that moves the stopper away from the second mount to bring it to the free position (IV) or moves the stopper towards the second mount to bring it to the locked position (III).

6. An adjustable landing gear according to claim 5, wherein the trigger which consists of a plurality of wires extending along the second mount and the stopper so as to be opposite each other on the second mount and the stopper, wherein when a current is passed through the wires in a same direction relative to each other, the wires enable the stopper to be pulled towards the second mount and when a current is passed through the wires in an opposite direction relative to each other, the wires enable the stopper to be pushed.

7. An adjustable landing gear according to claim 5, wherein the trigger which is a piston.

8. An adjustable landing gear according to claim 3, further comprising at least one spring between the second mount and the stopper, which applies force to the stopper to move the stopper from the locked position (III) to the free position (IV) during the flight.

9. An adjustable landing gear according to claim 3, further comprising a control unit, wherein when the first mount contacts the ground, if a current drawn by the motor exceeds a current value predetermined by the user, the control unit enables the stopper to be triggered, thereby moving the stopper to the locked position (III).

10. An adjustable landing gear according to claim 3, further comprising a plurality of support elements on the second mount, which contact the second protrusion in the locked position (III) so as to carry the force applied by the first mount carrying the air vehicle to the second protrusion.

11. An adjustable landing gear according to claim 9, wherein the control unit which triggers the first mount from the closed position (II) to the open position (I) during the landing of the air vehicle is configured to, enable the first mount to move with the rack gear and pinion gear on the second mount by means of the motor located on the first mount, measure the current drawn by the motor when the plurality of first mounts on the air vehicle contact the ground and the current drawn by the motor that moves each first mount in contact with the ground increases, move the stopper by transmitting a command to the trigger when the current drawn by the motor reaches the value predetermined by the user, enable the trigger to move the stop from the free position (IV) to the locked position (III), enables the trigger to move the stopper from the locked position (III) to the free position (IV) when the air vehicle takes off, and enable the motor located on each first mount to move the first mount on the second mount, so that the first mount is moved to the closed position (II).

12. An adjustable landing gear according to claim 1, wherein the fuselage forms part of a helicopter.

* * * * *